(12) United States Patent
Edwards et al.

(10) Patent No.: US 7,284,381 B2
(45) Date of Patent: *Oct. 23, 2007

(54) HEAT EXHAUSTION EVAPORATIVE COOLING

(75) Inventors: Tim L. Edwards, Oregon City, OR (US); Jeffrey B. Weber, Hillsboro, OR (US)

(73) Assignee: Emergency Water Solutions, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/373,653

(22) Filed: Mar. 9, 2006

(65) Prior Publication Data

US 2006/0162349 A1    Jul. 27, 2006

Related U.S. Application Data

(63) Continuation of application No. 10/851,615, filed on May 20, 2004, now Pat. No. 7,082,775.

(60) Provisional application No. 60/517,115, filed on Nov. 3, 2003.

(51) Int. Cl.
    *F28D 3/00*    (2006.01)
(52) U.S. Cl. ............................. 62/171; 62/304; 261/26
(58) Field of Classification Search ................. 62/121, 62/171, 304, 309, 314, 332, 239; 261/26, 261/DIG. 3, DIG. 43; 239/170
    See application file for complete search history.

(56) References Cited

U.S. PATENT DOCUMENTS

| | | | | |
|---|---|---|---|---|
| 2,307,014 A | * | 1/1943 | Becker et al. | 239/438 |
| 2,485,723 A | * | 10/1949 | Fitzgerald | 169/14 |
| 3,448,809 A | * | 6/1969 | Cymmer et al. | 169/15 |
| 3,713,589 A | * | 1/1973 | McNair et al. | 239/575 |
| 4,028,906 A | | 6/1977 | Gingold et al. | |
| 4,143,717 A | * | 3/1979 | Gagliardo et al. | 169/15 |
| 4,478,767 A | | 10/1984 | Watanabe et al. | |
| 4,535,601 A | | 8/1985 | Newell et al. | |
| 4,640,461 A | * | 2/1987 | Williams | 239/317 |
| 4,669,662 A | | 6/1987 | Bruce | |
| 4,671,456 A | | 6/1987 | Groff et al. | |
| 4,729,434 A | * | 3/1988 | Rohrbach | 169/24 |

(Continued)

FOREIGN PATENT DOCUMENTS

FR    2803214 A1    7/2001

(Continued)

*Primary Examiner*—Mohammad M. Ali
(74) *Attorney, Agent, or Firm*—J. Douglas Wells; Chernoff, Vilhauer, McClung & Stenzel, LLP

(57) ABSTRACT

A method and system for relief of heat exhaustion symptoms through evaporative and conductive cooling is provided, and, more particularly, involves a rapidly deployable mobile fogging system suitably designed for relief of heat exhaustion symptoms, including a mobile platform for transporting the rapidly deployable mobile fogging system to locations where relief of heat exhaustion symptoms is needed, one or more fogging nozzles disposed on the mobile platform and oriented for dispensing a cooling pocket area of fog adjacent to the mobile platform, a coolant delivery system fluidly connected to the one or more fogging nozzles, and one or more controls for regulating the dispensing of the cooling pocket area of fog. In one embodiment, the rapidly deployable mobile fogging system comprises an emergency response vehicle. In one embodiment, the emergency response vehicle comprises a fire truck.

20 Claims, 15 Drawing Sheets

U.S. PATENT DOCUMENTS

| | | | |
|---|---|---|---|
| 4,839,106 A | 6/1989 | Steiner | |
| 5,000,384 A | 3/1991 | Arnold | |
| 5,005,367 A | 4/1991 | Hwang | |
| 5,027,455 A | 7/1991 | Commisso et al. | |
| 5,112,535 A | 5/1992 | Robertson | |
| 5,125,764 A | 6/1992 | Veath, Sr. | |
| 5,146,762 A | 9/1992 | Atkins | |
| 5,248,448 A | 9/1993 | Waldron et al. | |
| 5,250,896 A * | 10/1993 | Mieczkowski et al. | 324/174 |
| 5,277,256 A * | 1/1994 | Bailey | 169/15 |
| 5,330,104 A | 7/1994 | Marcus | |
| 5,337,960 A | 8/1994 | Allen | |
| 5,338,495 A | 8/1994 | Steiner et al. | |
| 5,373,703 A | 12/1994 | Pal | |
| 5,494,576 A | 2/1996 | Hoppe et al. | |
| 5,497,633 A | 3/1996 | Jones et al. | |
| 5,529,536 A | 6/1996 | Sizemore et al. | |
| 5,540,383 A | 7/1996 | Ducey | |
| 5,542,413 A | 8/1996 | Horn | |
| 5,555,907 A | 9/1996 | Philipp | |
| 5,613,371 A | 3/1997 | Nelson | |
| 5,620,140 A | 4/1997 | Utter | |
| 5,620,633 A | 4/1997 | Junkel et al. | |
| 5,628,273 A | 5/1997 | Crouse, II | |
| 5,645,769 A | 7/1997 | Tamaru et al. | |
| 5,667,732 A | 9/1997 | Lederer | |
| 5,678,766 A * | 10/1997 | Peck et al. | 239/419 |
| 5,724,824 A | 3/1998 | Parsons | |
| 5,772,272 A | 6/1998 | Faddis | |
| 5,775,590 A | 7/1998 | Utter | |
| 5,785,204 A | 7/1998 | Thompson et al. | |
| 5,802,865 A | 9/1998 | Strauss | |
| 5,957,382 A | 9/1999 | Thomas | |
| 5,992,529 A * | 11/1999 | Williams | 169/14 |
| 6,003,326 A | 12/1999 | Hensley | |
| 6,027,137 A | 2/2000 | Rura | |
| 6,029,911 A | 2/2000 | Wantanabe et al. | |
| 6,076,739 A | 6/2000 | Littleford et al. | |
| 6,138,466 A | 10/2000 | Lake et al. | |
| 6,151,907 A | 11/2000 | Hale | |
| 6,158,140 A | 12/2000 | Orr | |
| 6,182,463 B1 | 2/2001 | Strussion et al. | |
| 6,325,362 B1 | 12/2001 | Massey et al. | |
| 6,361,024 B1 | 3/2002 | Carson | |
| 6,386,835 B1 | 5/2002 | Kalpakoff | |
| 6,389,835 B1 | 5/2002 | Uranga | |
| 6,398,136 B1 * | 6/2002 | Smith | 239/600 |
| 6,434,951 B2 | 8/2002 | Later | |
| 6,454,190 B1 | 9/2002 | Cook | |
| 6,487,871 B1 | 12/2002 | Augustine et al. | |
| 6,546,743 B1 | 4/2003 | Sullivan | |
| 6,581,855 B1 | 6/2003 | Cook | |
| 6,669,105 B2 | 12/2003 | Bryan et al. | |

FOREIGN PATENT DOCUMENTS

| | | |
|---|---|---|
| JP | 11-197567 | 7/1999 |

* cited by examiner

HEAT EXHAUSTION EVAPORATIVE COOLING

CROSS-REFERENCE TO RELATED APPLICATIONS

This application is a continuation of U.S. application Ser. No. 10/851,615, filed May 20, 2004 now U.S. Pat. No. 7,082,775, having the same title and inventors as the present application, which claims the benefit of U.S. provisional application Ser. No. 60/517,115 filed Nov. 3, 2003. The specifications of the above non-provisional parent and provisional applications are incorporated in their entireties herein by reference.

BACKGROUND OF THE INVENTION

The present invention relates to the field of evaporative and conductive cooling for relief of heat exhaustion symptoms in humans. More particularly, the invention relates to self-contained rapidly deployable fogging and micro-misting systems and methods for dispensing a cooling pocket area of fog from a mobile vehicle, thereby promoting evaporative and conductive cooling for the relief of heat exhaustion symptoms.

Heat illness, or heat exhaustion, is a common problem affecting firefighters, road and building contruction workers, and other personnel in situations demanding physical exertion, the use of protective garments, or work in harsh environments. In these and other situations, body heat, or metabolic heat, combines with radiant heat from the environment to elevate the person's body temperature. The body also gains heat by convection when the ambient air temperature rises above normal body temperature (98.6 degrees F.). The body attempts to control its temperature by raising and lowering the heart rate (raising and lowering blood pressure), sending blood to the surface of the skin, and through perspiration. As the perspiration evaporates, heat is drawn from the body. However, in situations where protective garments such as firefighting suits or protective jackets, boots, gloves, and so on are needed, the body's natural evaporative cooling process becomes overburdened.

Studies conducted on firefighters have shown that fire suppression activities produce over 400 kilocalories of heat per hour and that another 180 kilocalories of per hour can be attributed to radiant heat (heat from the fire). Evaporation of over one quart of perspiration is needed to remove 580 kilocalories of heat. Therefore, a firefighter needs to evaporate over one quart of perspiration during each hour of work in order to maintain a safe body temperature.

Heat illness occurs as the body loses its ability to regulate temperature and affects not only the person's welfare but also cognitive abilities. Notwithstanding the increased potential for dangerous accidents due to heat illness symptoms, left untreated, heat illness can rapidly lead to progressively worse conditions or even death.

Heat illness generally has three stages: heat stress, heat exhaustion, and heat stroke. These stages are often difficult to distinguish, therefore experts recommend treating for the worst case when there is any doubt. Symptoms of heat stress include cool or moist skin, weakness, dizziness, and nausea. Treatment for heat stress includes moving the victim to an area of shade, loosening the victim's clothing, and giving the victim water. The symptoms of heat exhaustion include a weak pulse (low blood pressure), shallow breathing (breathing rate increasing), clammy skin (perspiring), a pale face, a loss of appetite, and possible confusion and irritability. And treatment for heat exhaustion includes all the steps for heat stress plus sponging the victim with water, fanning to increase evaporation, and seeking medical attention. Finally, the symptoms of heat stroke include a rapid pulse, hot or dry skin (no perspiration), a high body temperature (over 105 degrees F.), mental confusion, and a loss of consciousness. The treatment for heat stroke includes all the steps for heat exhaustion plus immediately cooling the victim's body before evacuation to a hospital.

Close attention must be given to the symptoms of heat illness so that the appropriate treatment is given in time to avoid progressively more serious conditions. In many situations, particularly those involving firefighting, road construction, manual labor in warm weather, or simply where there are no ready-made or available sources of shade or cooling, the steps that can be taken to respond to symptoms of heat illness are limited. When there is no area of shade, for example, other means to provide cooling, such as evaporative cooling, are needed.

Prior inventions involving evaporative cooling have not satisfactorily addressed the particular needs for a self-contained, rapidly deployable, mobile evaporative cooling device suitable for firefighting, commercial, or other types of vehicles and suitably designed for relief of heat illness or heat exhaustion symptoms.

One prior invention consists of a portable misting fan. The device consists of a water storage container, a fan, and a mist nozzle. Water stored in the container is dispensed from mist nozzle directly into the fan's airflow stream. This helps atomize the mist into smaller droplets and projects the mist outward covering more area. The system must have a portable electrical means, such as a DC battery pack or electrical AC power source, which requires power cords and, thus, setup time. This design does not lend itself well for fixed mobile application because of the fan and other hardware related to such device and the required time for setting up the system.

Another practice consists of using mist fans or pressure misting systems for outdoor sports (football, soccer, golf, tennis, etc.), sunbathers, lounge areas, over vending machines, and mounting under tents. These water misting apparatuses include several spray nozzles that can be attached to a fixed surface individually or in series. Similar applications may be used at amusement parks to cool people while they are waiting in long lines. This type of technology has been designed for these limited applications (such as outdoor sports) and are not suitably designed for the rapid deployment and mobile heat illness or heat exhaustion recovery applications discussed herein. All of these misting systems require substantial setup or assembly before use.

Other misting systems consist of components such as a water tank, a water pump, and spray nozzle and are available for applications such as golf carts, boats, and baby carriage canopies. These systems are unsatisfactory for mobile heat illness recovery applications because of the low performance components selected, low effective volume or area of mist delivered, the unpleasantly or unsatisfactorily large particle size of the mist dispensed, and assembly or set up required with such systems.

BRIEF DESCRIPTION OF THE SEVERAL VIEWS OF THE DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENT

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Parts of the description will be presented using terminology commonly employed by those skilled in the art to convey the substance of their work to others skilled in the art. For example, a person having ordinary skill in the art will be able to comprehend terms such as ultraviolet (UV), micron, check valve, atomization, power-take-off (PTO), and pounds-per-square-inch (psi), pounds-per-square-inch-gauge (psig), pounds-per-square-inch-absolute (psia), cubic-feet-per-minute (cfm), evaporative cooling, convective cooling, conductive cooling, variable-mean-diameter (VMD) and so on in the context and intended meaning of the present invention and within the spirit and scope of the present invention.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Figure 1:
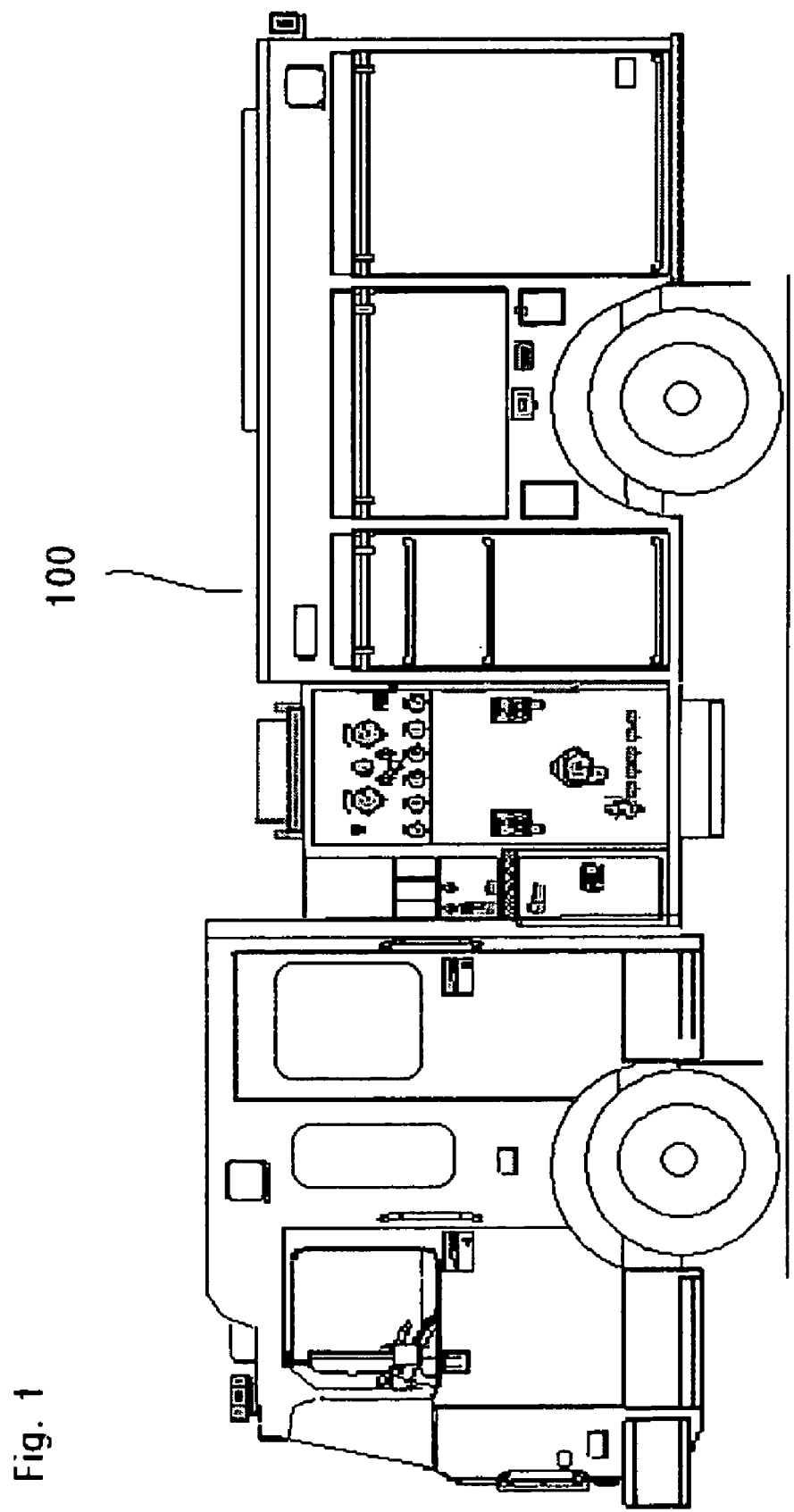
FIG. 1 illustrates an emergency response vehicle comprising the present invention, according to one embodiment.
Figure 2:
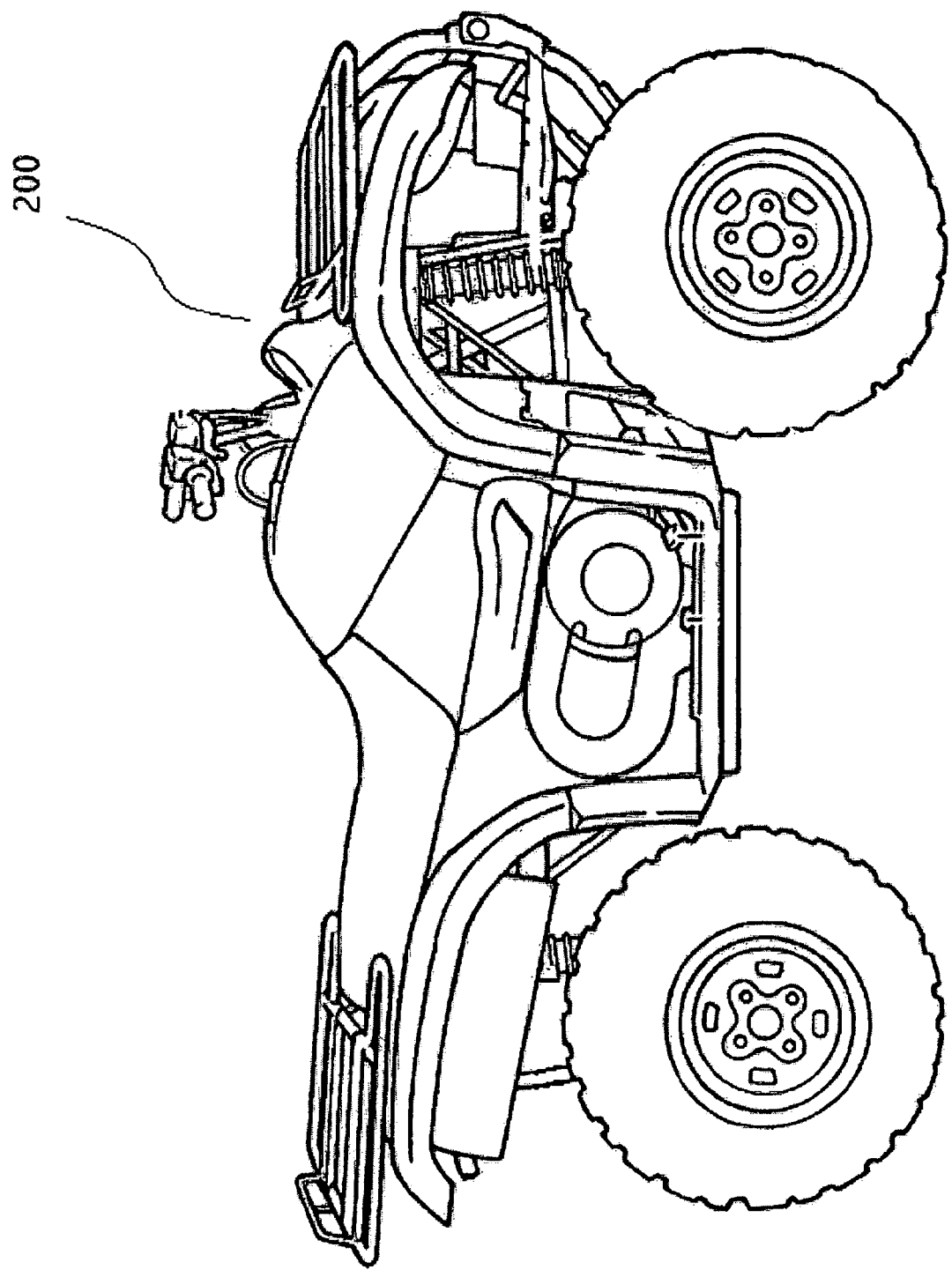
FIG. 2 illustrates an all-terrain type vehicle comprising the present invention, according to one embodiment.
Figure 3:
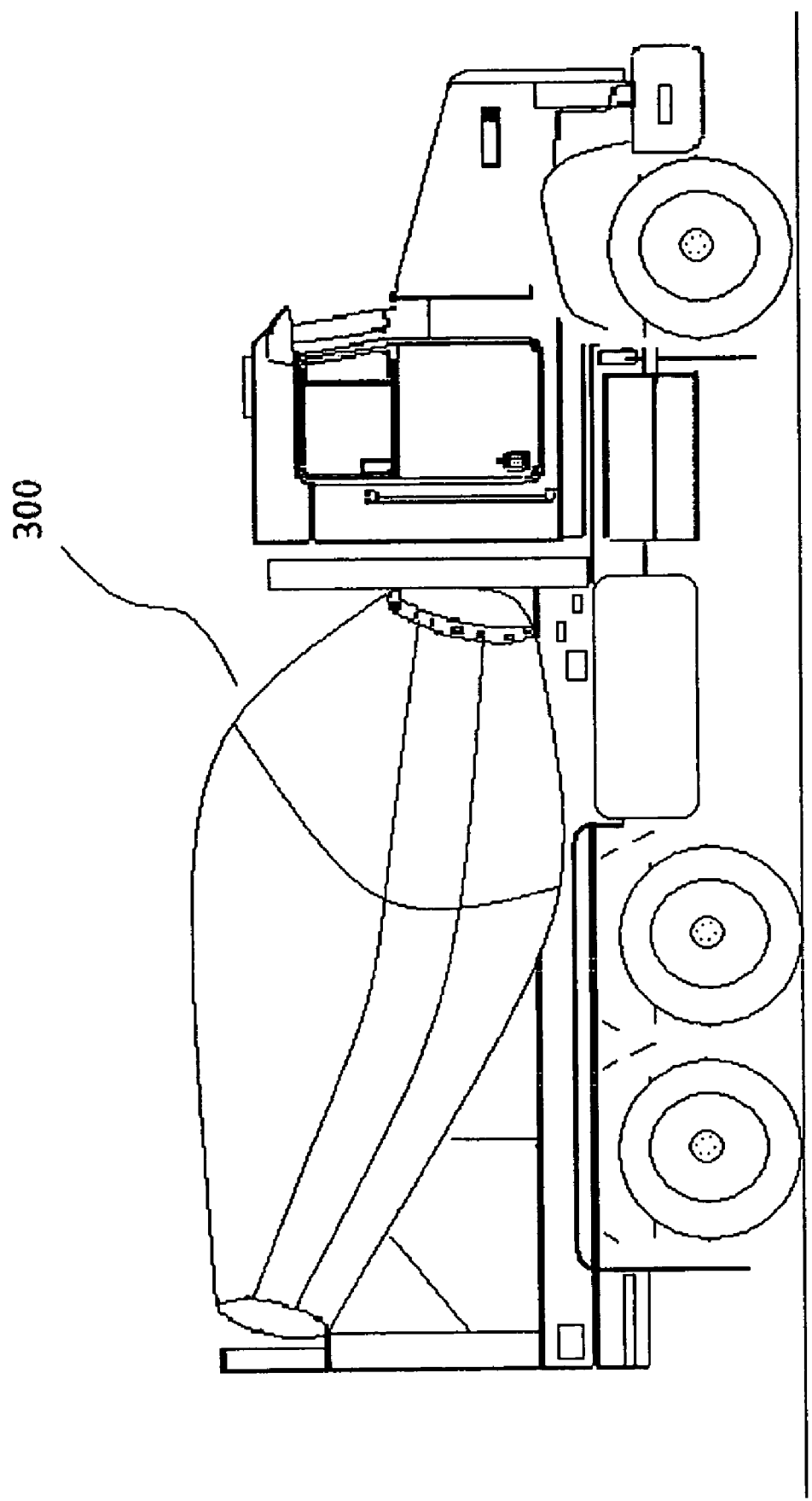
FIG. 3 illustrates an industrial type vehicle comprising the present invention, according to one embodiment.
Figure 4:
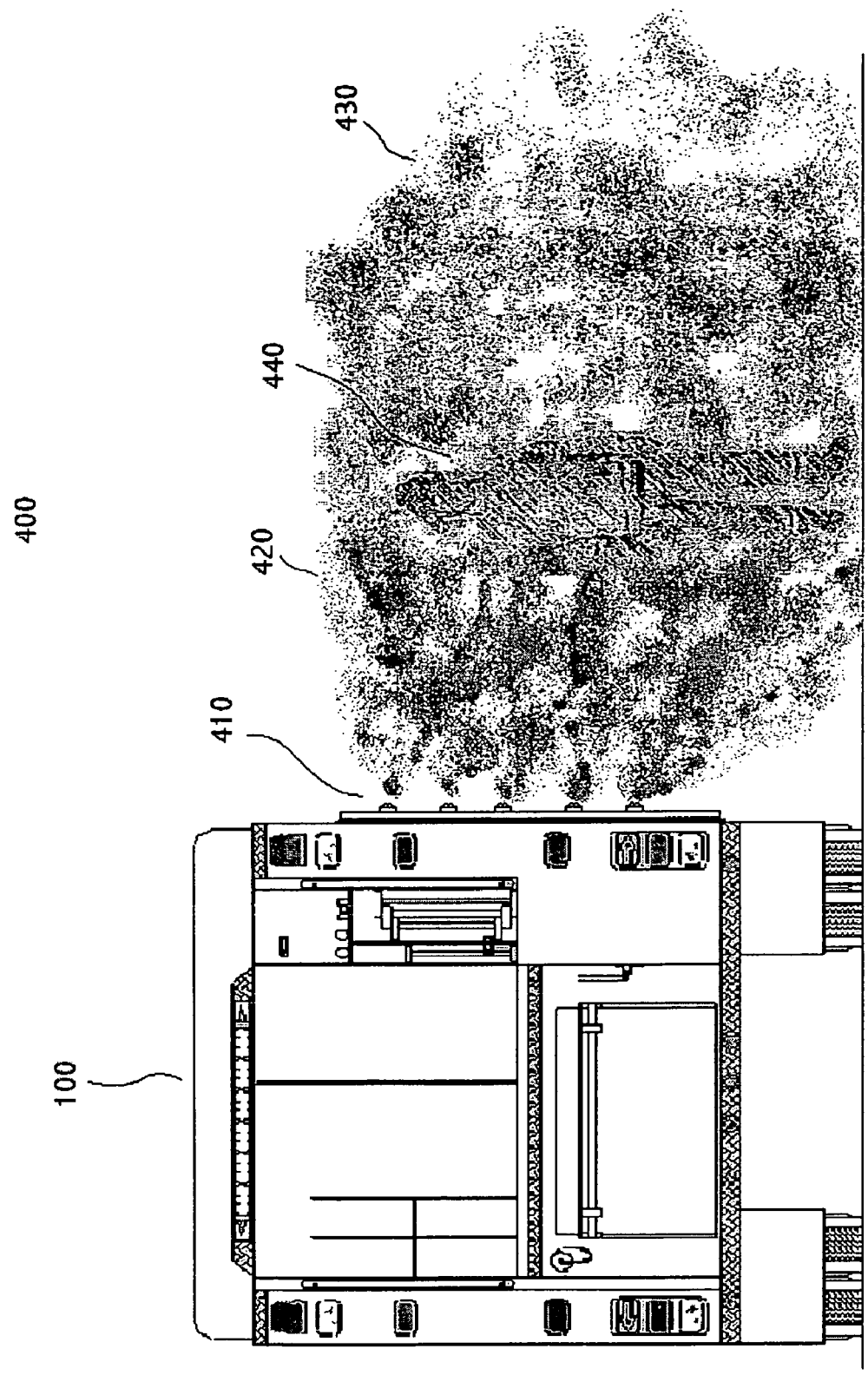
FIG. 4 illustrates an emergency response vehicle with the present invention in operation, according to one embodiment.
Figure 5:
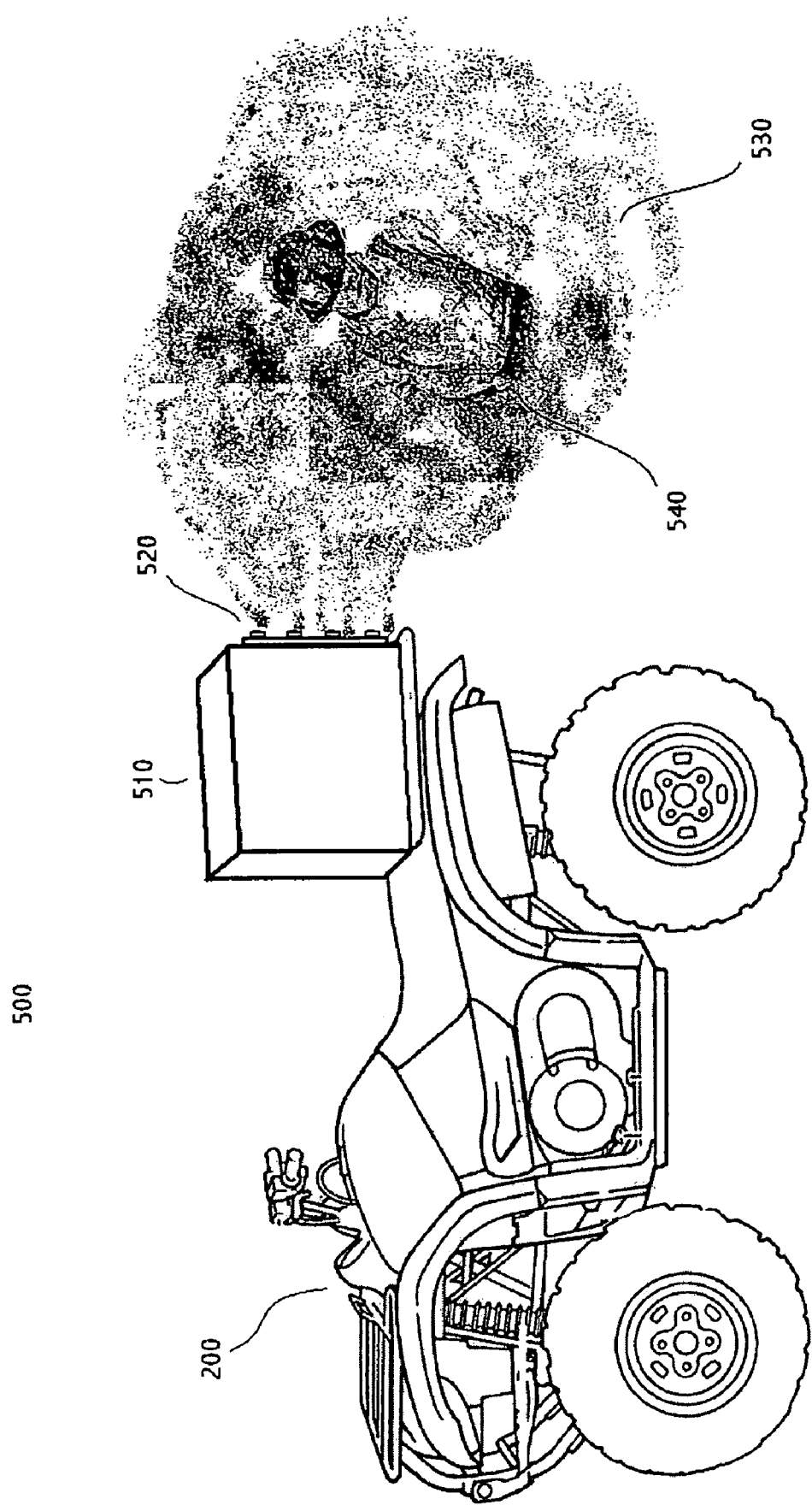
FIG. 5 illustrates an all-terrain type vehicle with the present invention in operation, according to one embodiment.
Figure 6:
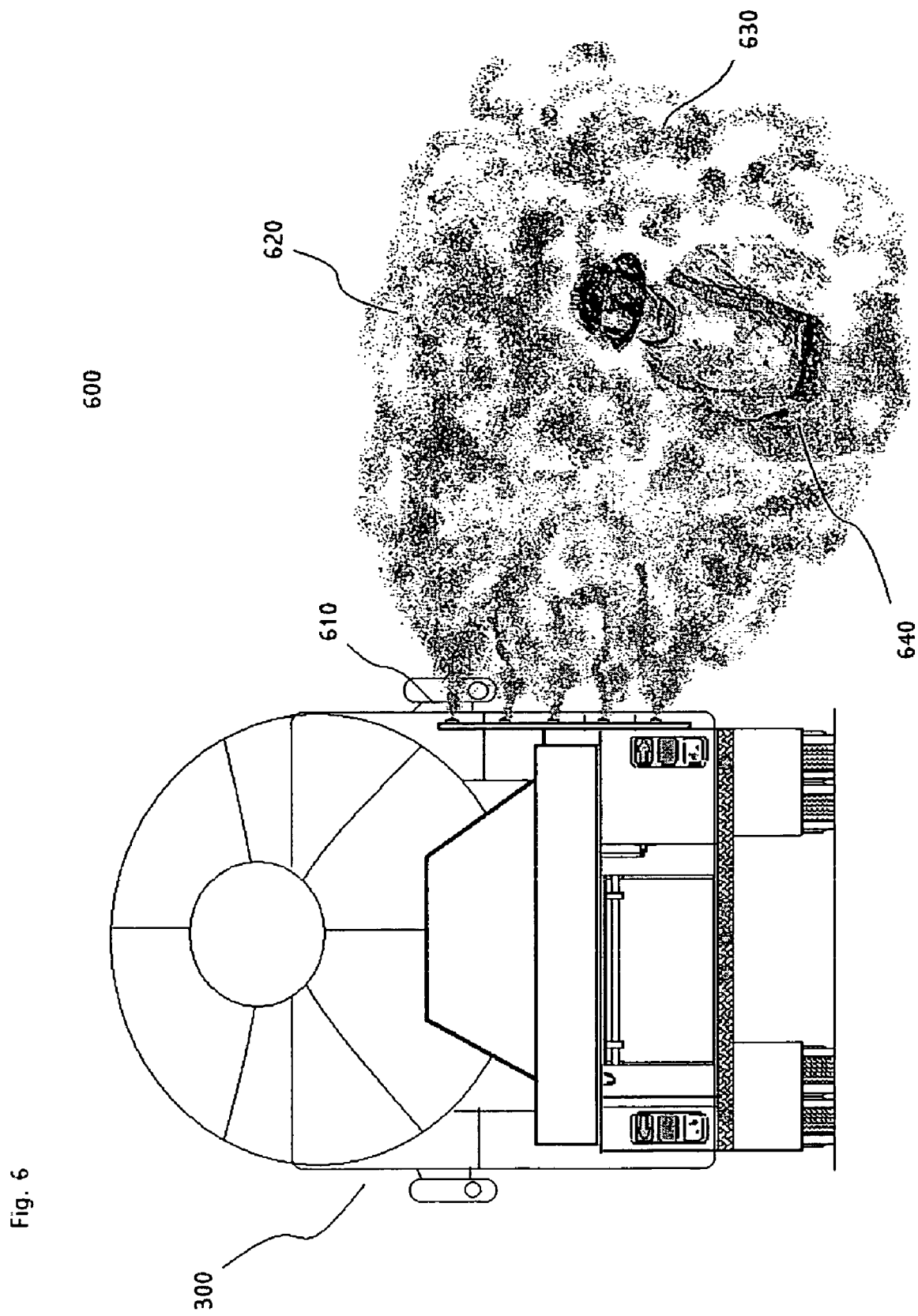
FIG. 6 illustrates an industrial type vehicle with the present invention in operation, according to one embodiment.

As an overview, FIGS. 1-3 illustrate examples of common vehicles comprising the present invention, and FIGS. 4-6 illustrate examples of the present invention in operation for those particular vehicles depicted in FIGS. 1-3.

As a first example, FIG. 1 comprises an emergency response vehicle 100 such as a fire truck. In one embodiment, the mobile platform comprises a vehicle capable of carrying a person or several persons on- or off-highway to locations where relief of heat exhaustion symptoms is needed. In one embodiment of the present invention, the emergency response vehicle 100 comprises a cooling apparatus completely mounted and ready for immediate use without any setup steps whatsoever. In one embodiment, the emergency response vehicle 100 comprises a fire truck dispatched to a hazardous location such as the scene of a fire. Once emergency response vehicle 100 is on location, the installed cooling apparatus may be immediately operated without setting up fans, hooking up water supplies, connecting power lines, or erecting any enclosure structures. As will be discussed in more detail, the present invention comprises a rapidly deployable highly mobile fogging system that dispenses a pocket area of cooling fog adjacent to the mobile platform in which the cooling system is installed.

Referring next to FIG. 2, another example mobile platform is illustrated, an all-terrain-vehicle 200. Such vehicles are commonly used for access to remote areas, transportation of fire fighting personnel in unimproved areas, farming applications, and so forth. The present invention may be completely mounted on vehicles such as all-terrain-vehicle 200. As will be discussed, the present invention comprises a self-contained system having, according to one embodiment, electrical and mechanical power supplied for the cooling apparatus by the mobile platform such as all-terrain-vehicle 200.

Finally, FIG. 3 illustrates a commercial vehicle 300 such as a concrete hauler. In one embodiment, commercial vehicle 300 comprises a cooling apparatus for dispensing a cooling pocket area of fog to provide relief of heat exhaustion symptoms at a job site.

Numerous other vehicles may be used. Other examples include, but are not limited to, recreational vehicles such as motorhomes and the like, mobile blood donation vehicles, sporting event vehicles such as auto racing support vehicles, as well as installations on trailers that can be towed by on- or off-highway vehicles. As will be appreciated by those skilled in the art, a wide variety of mobile platform may be used.

The operation of the present invention for emergency response vehicle 100 is illustrated in FIG. 4. In one embodiment, the present invention comprises dispensing of atomized coolant fluid from fogging nozzles 410 mounted on the side of emergency response vehicle 100, creating a cooling pocket area of fog, the cooling pocket area extending from 420 to 430, around the subject emergency response personnel 440, the cooling pocket area of fog being formed by the fogging action of the fogging nozzles 410. The present invention thus provides effective relief of heat exhaustion symptoms, especially in situations 400 where emergency personnel 440 is wearing protective garments such as firefighting suits or protective jackets, boots, gloves, and so on. In such garments the body's natural evaporative cooling process becomes overburdened unless relief is provided. In situation 400 relief is provided by evaporative cooling (evaporation of the atomized coolant liquid), convective cooling (as the atomized coolant fluid is ejected outward from the emergency response vehicle 100), and conductive cooling (as the coolant fluid, in one embodiment, is dispersed at a temperature already lowered to improve heat transfer from emergency response personnel 440 to the atomized coolant fluid in the cooling pocket area of fog extending from 420 to 430).

Again referring to FIG. 4, in one embodiment the atomized coolant fluid dispensed from fogging nozzles 410 merely comprises standard, readily available tap water. In another embodiment, however, the atomized coolant fluid dispensed from fogging nozzles 410 comprises purified water for improved atomization through fogging nozzles 410. Likewise, the coolant fluid dispensed from atomization nozzles may comprise a wide variety of compositions. As will be discussed, in one embodiment, the atomized coolant fluid dispensed from fogging nozzles 410 comprises coolant fluid atomized by mixing the coolant fluid with a compressed coolant gas such as compressed air.

Moving on to FIG. 5, the operation of the present invention, according to one embodiment, is illustrated. The situation 500 is similar to the situation 400 except for all-terrain-vehicle 200 used in place of emergency response vehicle 100. Fogging nozzles 510 disposed on the side of mobile platform, all-terrain-vehicle 200, dispense atomized coolant fluid to create a cooling pocket area of fog adjacent to the mobile platform from 520 to 53 within which one or more persons 540 is provided relief of heat exhaustion symptoms.

Likewise, FIG. 6 illustrates the operation of the present invention, according to one embodiment, where situation 600 is again similar to situation 400 except that commercial vehicle 300 is used in place of emergency response vehicle 100. Here, fogging nozzles 610 disposed on the side or rear of mobile platform, commercial vehicle (cement hauler) 300, dispense atomized coolant fluid to create a cooling pocket area of fog adjacent to the mobile platform from 620 to 630 within which, in one embodiment, one or more construction workers 640 is provided relief of heat exhaustion symptoms.

Figure 7:
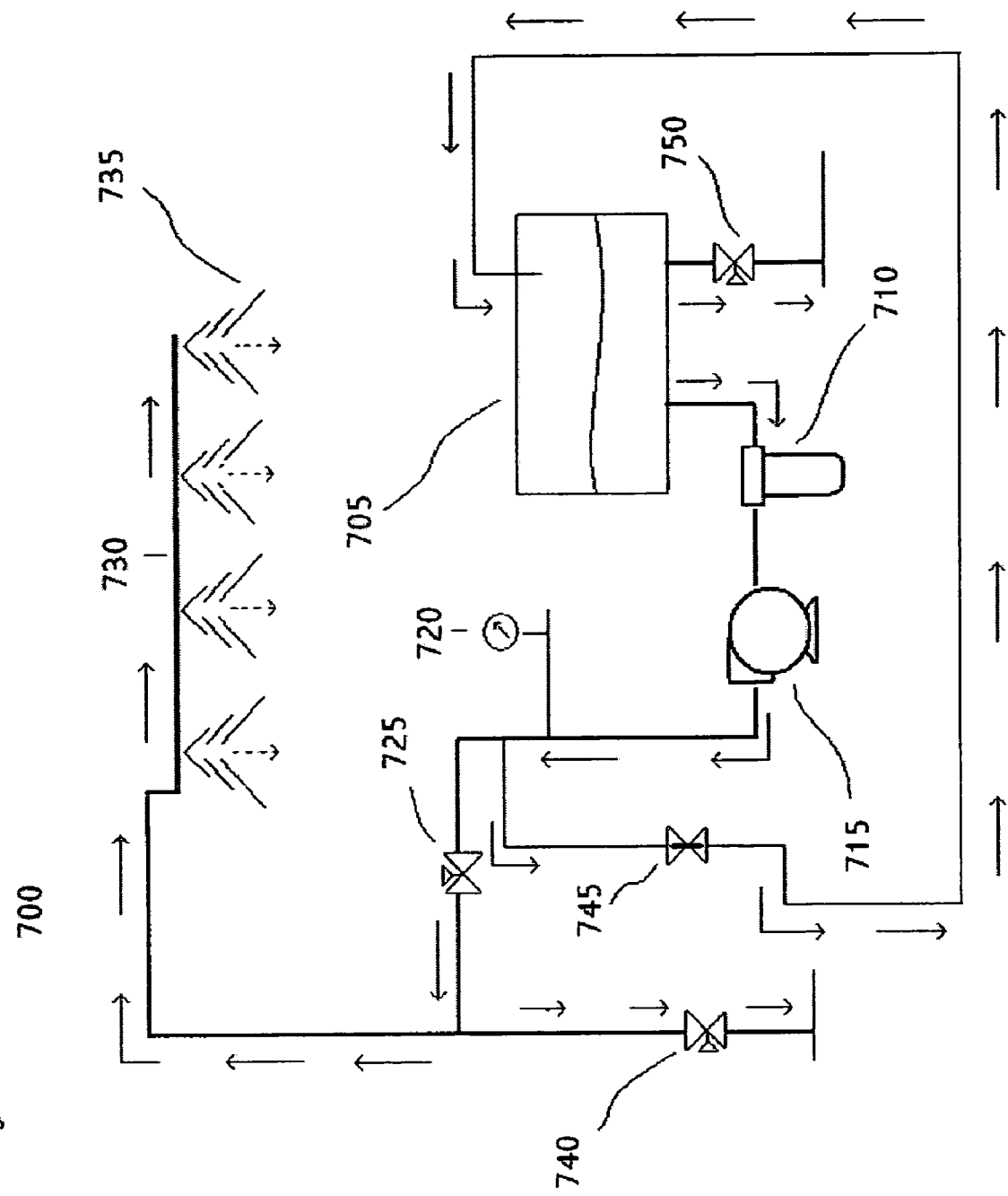
FIG. 7 illustrates the operational flow of portions of one embodiment of the present invention.

For a more detailed discussion of the coolant delivery system, in one embodiment, for delivering coolant to one or more fogging nozzles disposed on a mobile platform, we turn now to FIG. 7. In one embodiment, coolant delivery system 700 comprises refillable reservoir 705 fluidly connected with one or more coolant liquid conditioning stages 710 which in turn flows coolant liquid to coolant delivery pump 715. In one embodiment, one or more coolant liquid conditioning stages 710 comprises one or both an ultraviolet (UV) disinfecting/sanitizing unit and a particulate filter. In one embodiment, one or more coolant liquid conditioning stages 710 additionally comprises one or more chillers for lowering the temperature of the coolant fluid, thereby improving the cooling capacity of the cooling pocket area of fog dispensed from fogging nozzles 735. That is, in one embodiment, one or more coolant liquid conditioning stages 710 comprises a particulate filter and/or an ultraviolet disinfecting unit fluidly followed by one or more chillers to lower the temperature of coolant liquid received from the preceding particulate filter and/or UV disinfecting unit.

Figure 7A:
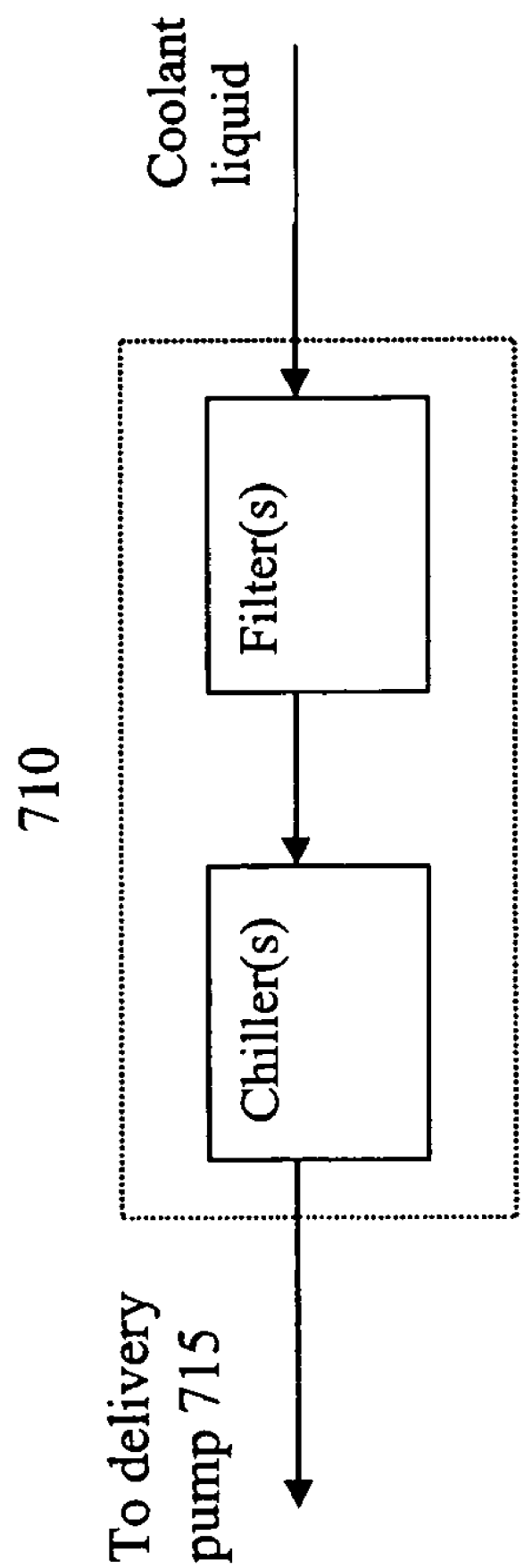
FIG. 7a illustrates coolant conditioning stages having one or more filters and one or more chillers, according to one embodiment.

FIG. 7a illustrates coolant conditioning stages 710 having one or more filters and one or more chiller, according to one embodiment. As shown, coolant liquid flows through the one or more filters, through the one or more chillers, and out of the coolant conditioning stages 710 to the delivery pump 715.

According to one embodiment, coolant delivery pump 715 receives coolant liquid directly from refillable reservoir 705. In another embodiment, coolant delivery pump 715 alternatively receives coolant fluid from an outside source such as an outside water line. For example, emergency response vehicles 100, commercial vehicles 300, and recreational vehicles, to name just a few, often are equipped with water supply input lines, accepting, for example, standard residential pressure water hose connections. Or, with certain emergency response vehicles 100 or fire trucks, such water supply lines may comprise connections with municipal fire hydrants or other special use water supply infrastructure.

Continuing with FIG. 7, coolant delivery pump 715 receives coolant liquid as described and delivers pressurized coolant liquid, according to one embodiment, measured by PSI gauge 720, through one or more coolant fluid lines (shown but not numbered) and fluidly controlled by one or more valves, such as solenoid valve 725, to fog manifold 730 whereon one or more fogging nozzles 735 are fluidly connected in an arrangement and orientation permitting the dispensing of a cooling pocket area of fog from the fogging nozzles 735. Additional check valves and so forth are included, in one embodiment, so as to provide a robust, controllable, and lower maintenance system. In one embodiment, solenoid valve 740 is positioned fluidly downstream from solenoid valve 725 to provide a drain for the system. Further, in one embodiment, safety relief valve 745 is positioned fluidly downstream of coolant delivery pump 715 and PSI gauge 720, as shown in FIG. 7, to provide overpressure relief, with the overflow of coolant liquid recycled back to refillable reservoir 705. Drain valve 750 is also provided, as shown in FIG. 7, in one embodiment, to allow for draining refillable reservoir 705.

Not shown in FIG. 7 are electrical connections, according to one embodiment, controllably connecting various components shown in FIG. 7 to allow for regulation of the dispensing of a cooling pocket area of fog from fogging nozzles 735. In one embodiment, a control panel is provided with various displays for such components as PSI gauge 720 and indicators and switches for controlling various components such as solenoid valve 725 (to activate, deactivate, and control the flow of coolant liquid to fog manifold 730 and fogging nozzles 735) and solenoid valve 740 (to drain the system).

One skilled in the art will appreciate that additional controls may be added. For example, additional controls may be added to indicate coolant level in refillable reservoir 705, various valve position indicators such as a valve position indicator for drain valve 705 and solenoid valves 725 and 740, and pressure leading to coolant delivery pump 715 (indicating the fluid resistance through any coolant conditioning stages 710). Furthermore, one skilled in the art will appreciate that some or all controls may be automated so as to minimize the manual controllability of various system components. In one embodiment, a control panel is provided with an on-off switch, a display for indicating active operation of the system, and a control valve for adjusting and regulating the coolant flow to fogging nozzles 735 and, thus, characteristics such as rate of atomized coolant flow from fogging nozzles 735.

Still referring to FIG. 7, in one embodiment, refillable reservoir 705 comprises a rotational molded (therefore seamless) polyethylene plastic tank with a volume capacity of approximately 12 gallons, although one skilled in the art will readily appreciate that the size and particular construction of refillable reservoir 705 are not limited. In one embodiment, the coolant fluid lines comprise, but are not limited to, polyethylene plastic tubing. The coolant conditioning stage 710, in one embodiment, comprise one or both of an ultraviolet fluid conditioning filter (a UV disinfection cylinder which typically kills greater than 99% of bacteria) and a stainless steel particulate filter (for example, a 40 micron filter cartridge). In one embodiment, coolant conditioning stage 710 additionally comprises one or more chillers for cooling the coolant liquid. Such additional chillers may be selected from a wide variety of commercially available fluid chillers. One skilled in the art will appreciate that using one or more chillers, as described, according to one embodiment, improves the cooling capacity of the cooling pocket area of fog dispensed, especially in situations where there is high ambient humidity.

The coolant delivery pump 715, according to one embodiment, comprises a commercial grade displacement/diaphragm type pump capable of delivering an operating pressure of 25 to 65 psig (using water as the coolant liquid) and requiring 12 volts DC power. In another embodiment, coolant delivery pump 715 comprises a commercial grade high PSI pump capable of delivering pressure around 1500 psi.

In one embodiment, power requirements for the aforementioned components, and those to be mentioned hereafter, are provided by power components available on the mobile platform or vehicle (or a combination of vehicle and mobile platform in the case of a trailer installation). For example, vehicle battery power may be used to supply the 12 volts DC needed to operate the coolant delivery pump 715, according to one embodiment. Alternatively, a power-take-off (PTO) device may be used to provide mechanical or rotational power (torque) to coolant delivery pump 715 wherein such pump is of a design to work cooperatively with such PTO device. Such a PTO device, in one embodiment, may be used to power other components discussed previously and that remain to be discussed hereafter (electrically, through the use of a vehicle alternator and battery, or mechanically, through powertrain linkages to transfer torque). In one embodiment, power provided to coolant delivery pump 715 and other components that remain to be discussed comprises mechanical power from belt linkages with the fan belt system of the drive motor (often a diesel or gasoline engine) inherent to a vehicle such as emergency response vehicle 100.

Figure 7B:
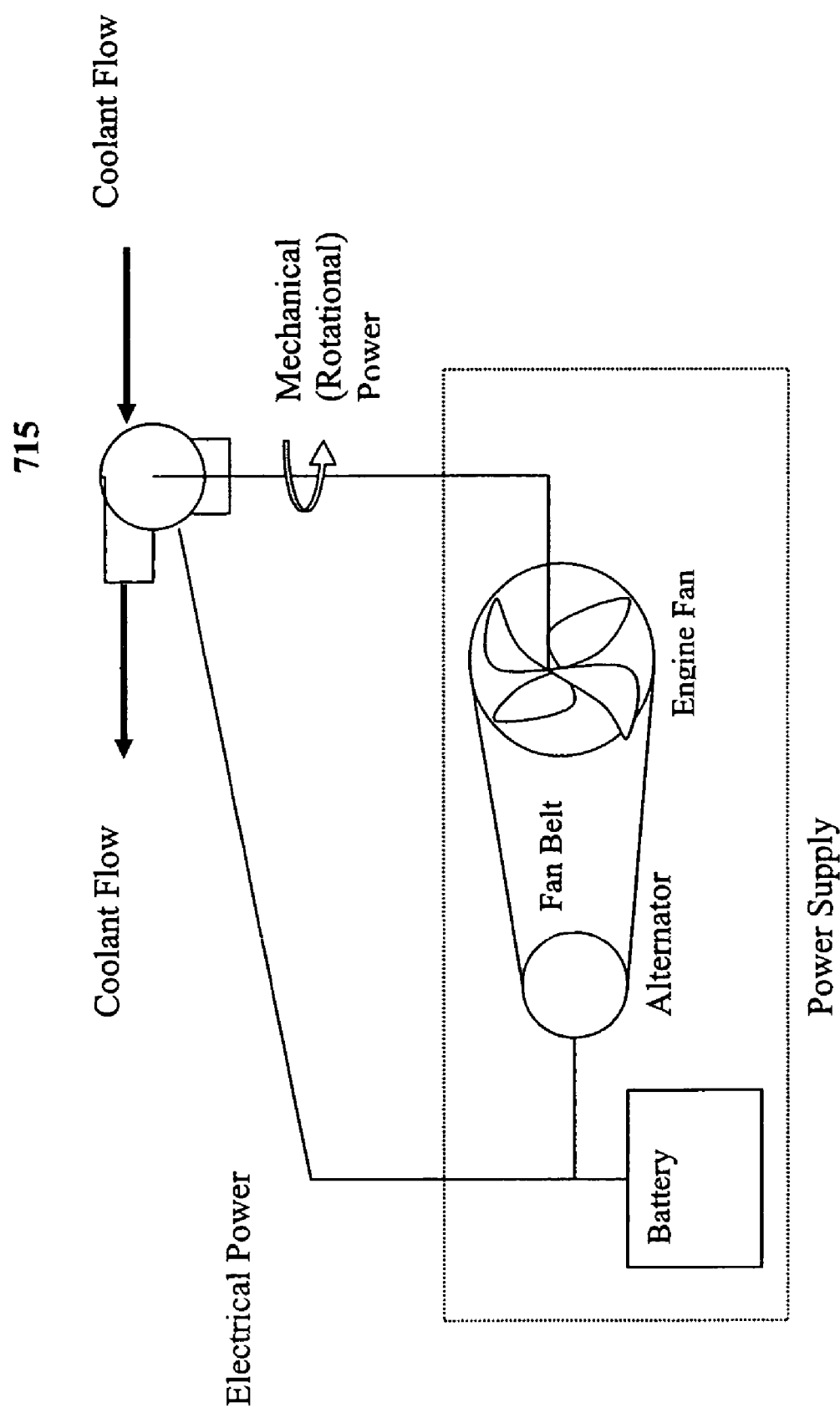
FIG. 7b illustrates a coolant pump mechanically or electrically powered by an engine fan linkage or an engine alternator, respectively, according to alternate embodiments.
Figure 7C:
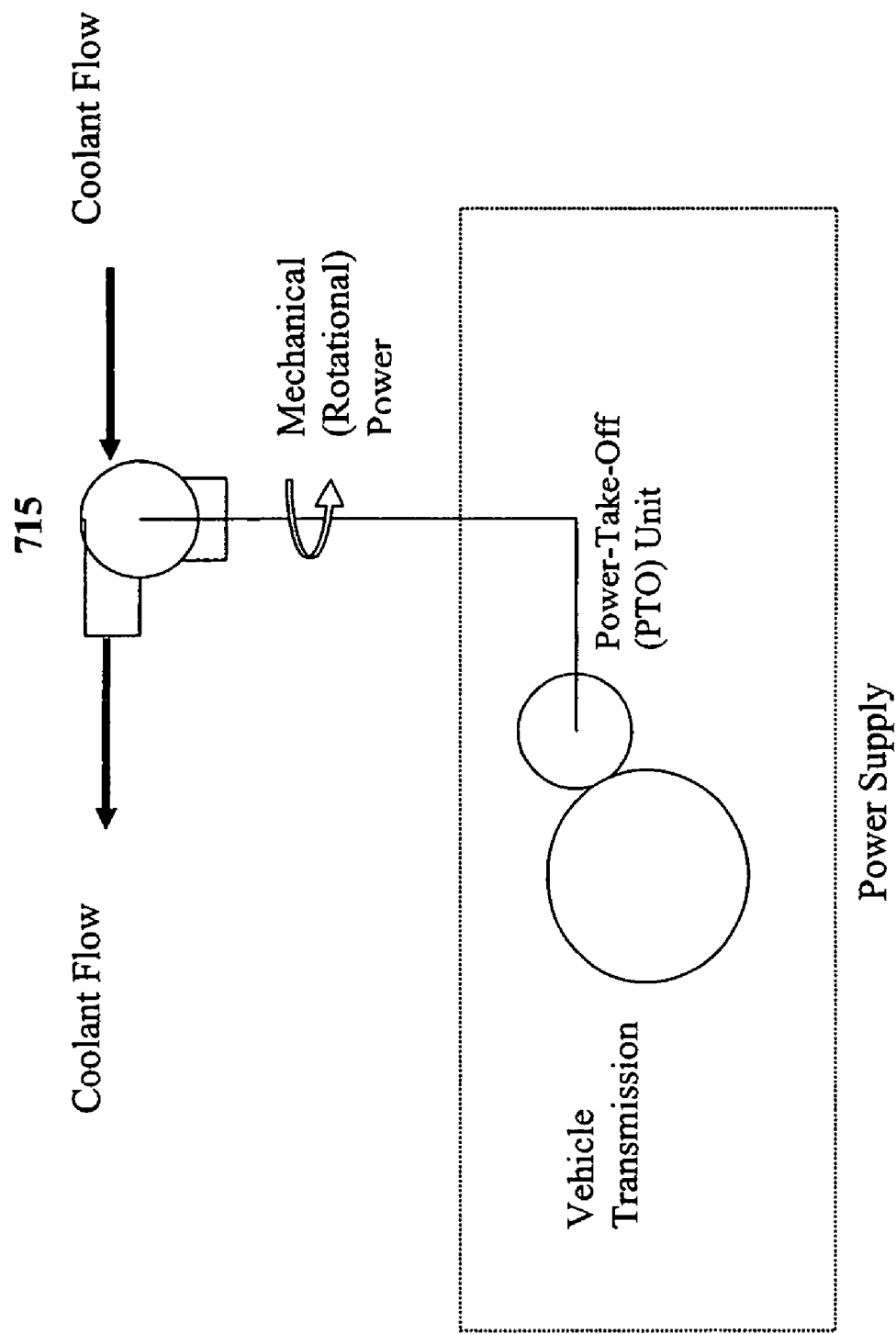
FIG. 7c illustrates a coolant pump mechanically powered by a power-take-off unit, according to alternate embodiments.

FIG. 7*b* illustrates a coolant pump 715 mechanically or electrically powered by an engine fan linkage or an engine alternator, respectively, according to alternate embodiments. And FIG. 7*c* illustrates a coolant pump 715 mechanically powered by a power-take-off unit, according to alternate embodiments. In other embodiments, as will be discussed below, similar electrical or mechanical powering means may be used to power other powered components, such as, for example, a coolant gas compressor. In various embodiments, an air compressor on-board the mobile platform may be electrically or mechanically powered as shown in FIGS. 7*b*-7*c*.

Referring still to FIG. 7, coolant delivery system 700 comprises fogging nozzles 735 for, according to one embodiment, dispensing coolant liquid received by fog manifold 730. In one embodiment, multiple fogging nozzles 735 are arranged and fluidly connected with fog manifold 730 with separation between each of the individual fogging nozzles 735 or between pairs of fogging nozzles 735 so that the dispensed cooling pocket area of fog is adequate in shape and size to effectively provide relief of heat exhaustion symptoms. As will be readily understood by one practiced in the art, fogging nozzles are generally commercially available in a wide variety of configurations, dispensing patterns, volume capacities, pressure limitations, and so forth. In one embodiment, fogging nozzles 735 comprise high pressure coolant liquid dispensing nozzles and coolant delivery pump 715 comprises a high PSI pump operating in the range of 500 to 1500 psi, the higher pressure allowing for greater atomization of the coolant dispensed. In one embodiment, the dispensed cooling pocket area of fog comprises coolant droplets in the 10 to 40 micron range. Larger droplet sizes up to droplets under 60 microns in diameter are generally considered to comprise mist. Droplet sizes greater than 60 microns in diameter are generally considered to comprise fine spray.

In one embodiment, a smaller mobile platform such as all-terrain-vehicle 200 may be more economically fitted with a high pressure coolant liquid system such as coolant delivery system 700 using coolant liquid fogging nozzles 735 rather than coolant gas/coolant liquid mixing type fogging nozzles as will be discussed. In one embodiment, fogging nozzles 735 comprise high pressure coolant liquid dispensing nozzles and coolant delivery pump 715 comprises a high PSI pump operating at pressures above the standard residential water supply pressure range of 40 psi to 65 psi.

Figure 8:
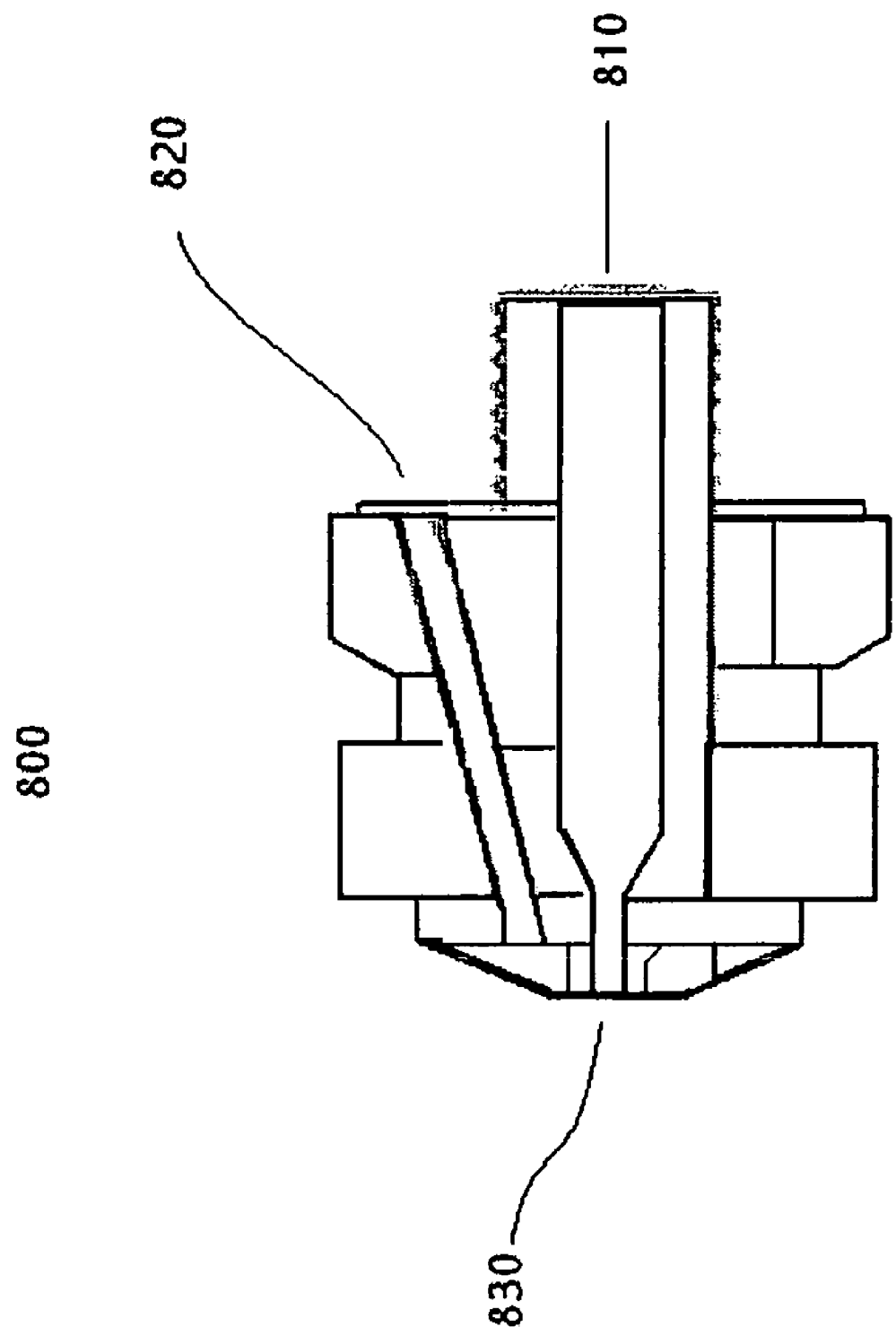
FIG. 8 illustrates an external mix fog nozzle, according to one embodiment of the present invention.
Figure 9:
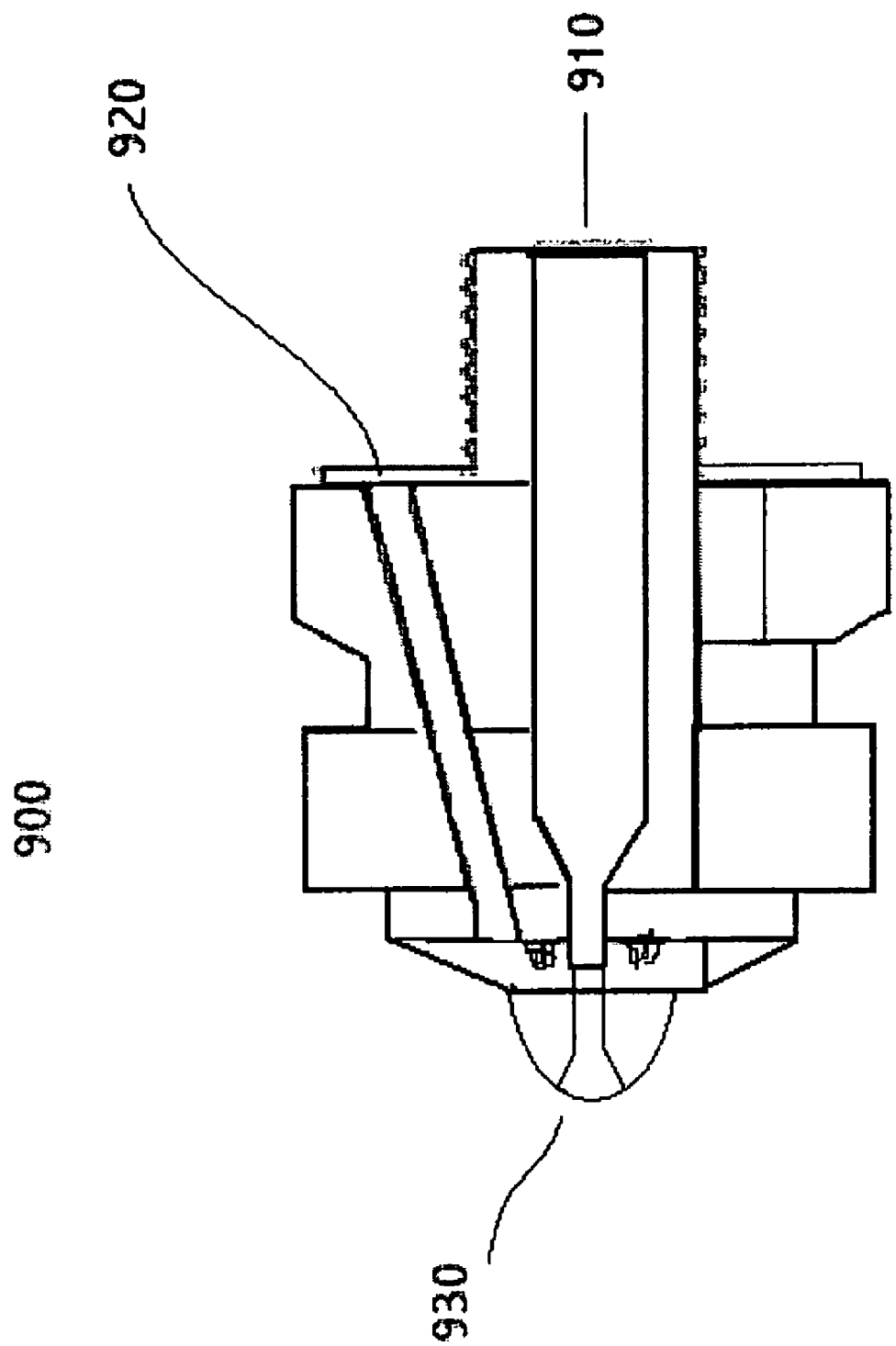
FIG. 9 illustrates an internal mix fog nozzle, according to one embodiment of the present invention.

Turning now to FIGS. 8-9, two different coolant gas/coolant liquid mixing fogging nozzle designs are illustrated. FIG. 8 illustrates a cross-sectional view of an external mix type fogging nozzle 800, and FIG. 9 illustrates a cross-sectional view of an internal mix type fogging nozzle 900.

The external mix type fogging nozzle 800, shown in FIG. 8, comprises a design whereby coolant liquid 810 mixes with coolant gas 820 external to the nozzle tip 830. With this type of nozzle, coolant liquid flow and coolant gas flow may be independently controlled. In one embodiment, coolant liquid 810 comprises water, and coolant gas 820 comprises air. As well known in the art, mixing nozzles may use lower coolant fluid pressures than non-mixing type nozzles because the high velocity of coolant gas injected into the coolant fluid stream is used to atomize the coolant fluid dispensed. Mixing type atomization nozzles such as external mix type fogging nozzle 800 generally provide for dispensing of smaller coolant fluid droplet sizes than possible with non-mixing type nozzles.

Alternatively, the internal mix type fogging nozzle 900, shown in FIG. 9, comprises a design whereby coolant liquid 910 mixes with coolant gas 820 internal to the nozzle in an internal mixing chamber 930. With this type of nozzle, coolant liquid flow and coolant gas flow may not be independently controlled, and a change in the flow rate of coolant gas 920 will affect the flow rate of coolant liquid 910. In one embodiment, coolant liquid 910 comprises water, and coolant gas 920 comprises air.

Figure 10:
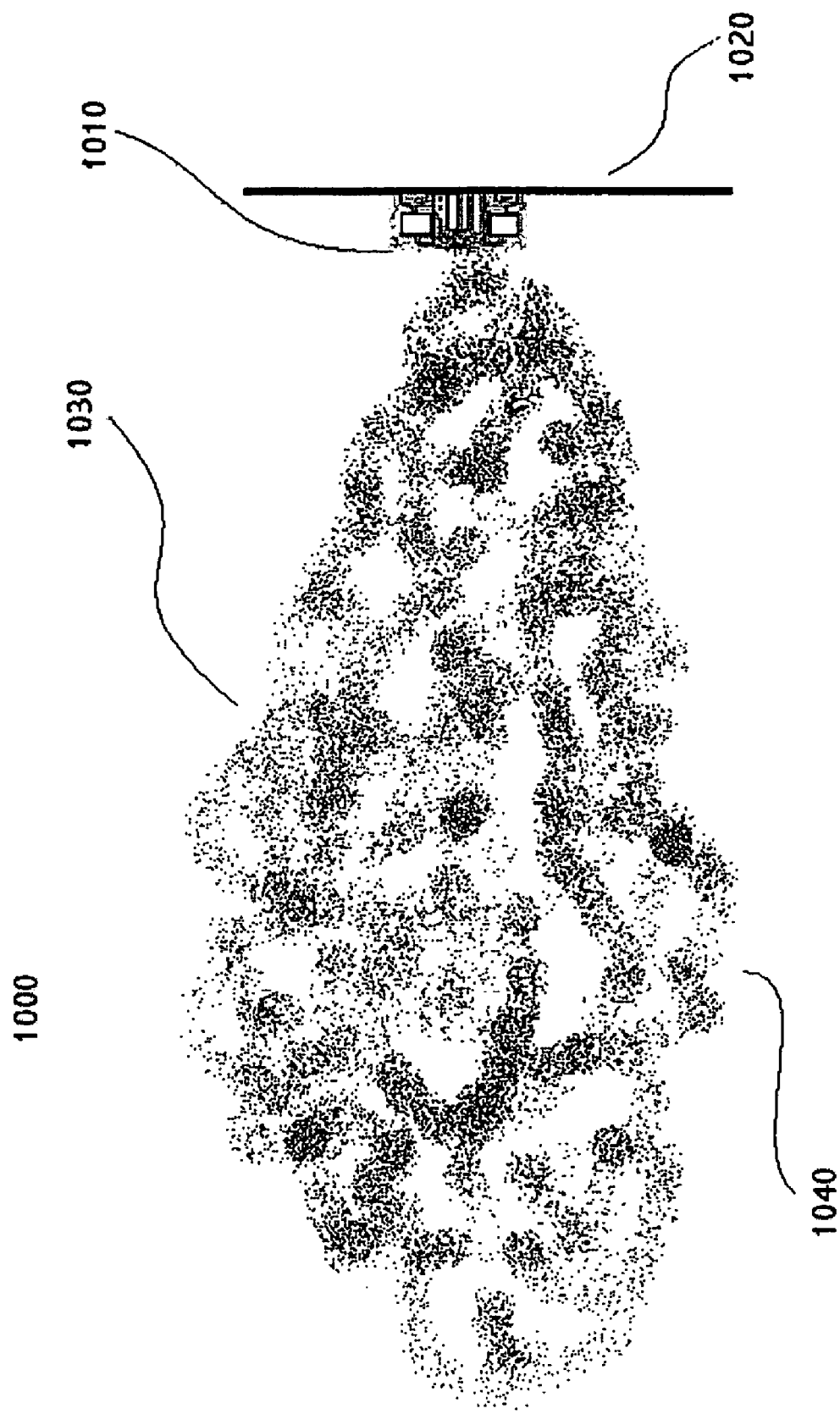
FIG. 10 illustrates a fog nozzle in operation, according to one embodiment of the present invention.

Referring next to FIG. 10, fogging nozzle operation 1000 is illustrated. As shown, in one embodiment, fogging nozzle 1010 is disposed on a side structure of mobile platform 1020 (a mobile vehicle such as emergency response vehicle 100) and oriented to dispense a cooling pocket area of fog from 1030 to 1040 outward, away from the side of mobile platform 1020. The cooling pocket area of fog from 1030 to 1040, in one embodiment, is large enough to envelope one or more persons needing relief of heat exhaustion symptoms. In one embodiment, one or more persons needing relief of heat exhaustion symptoms may stand on the ground alongside mobile platform side 1020 and within the cooling pocket area of fog from 1030 to 1040. More than one fogging nozzle 1010 may be used, according to one embodiment, to provide a larger cooling pocket area of fog from 1030 to 1040. In one embodiment, multiple fogging nozzles such as fogging nozzle 1010 are positioned along the sides of a mobile platform and separated to provide a larger cooling pocket area of fog. In one embodiment, fogging nozzle 1010 comprises coolant liquid/coolant gas mixing type fogging nozzle 800 or 900, providing finer droplet sized fog in the cooling pocket area of fog from 1030 to 1040. In one embodiment, air from an air compressor on-board a mobile platform with side structure 1020, providing pressurized air through fogging nozzle 1010 and thereby further atomizing the coolant liquid dispensed.

In one embodiment, fogging nozzle 1010 comprises a coolant gas/coolant liquid mixing type fogging nozzles such as external mix type fogging nozzle 800, the coolant gas comprises air delivered at between 65 psig and 90 psig, the coolant liquid comprises water delivered at between 25 psig and 65 psig, and fogging nozzle 1010 dispenses fog droplets with a variable-mean-diameter of between 10 and 40 microns. In one embodiment, fogging nozzle 1010 comprises a commercial grade, durable nickel plated brass construction.

Figure 11:
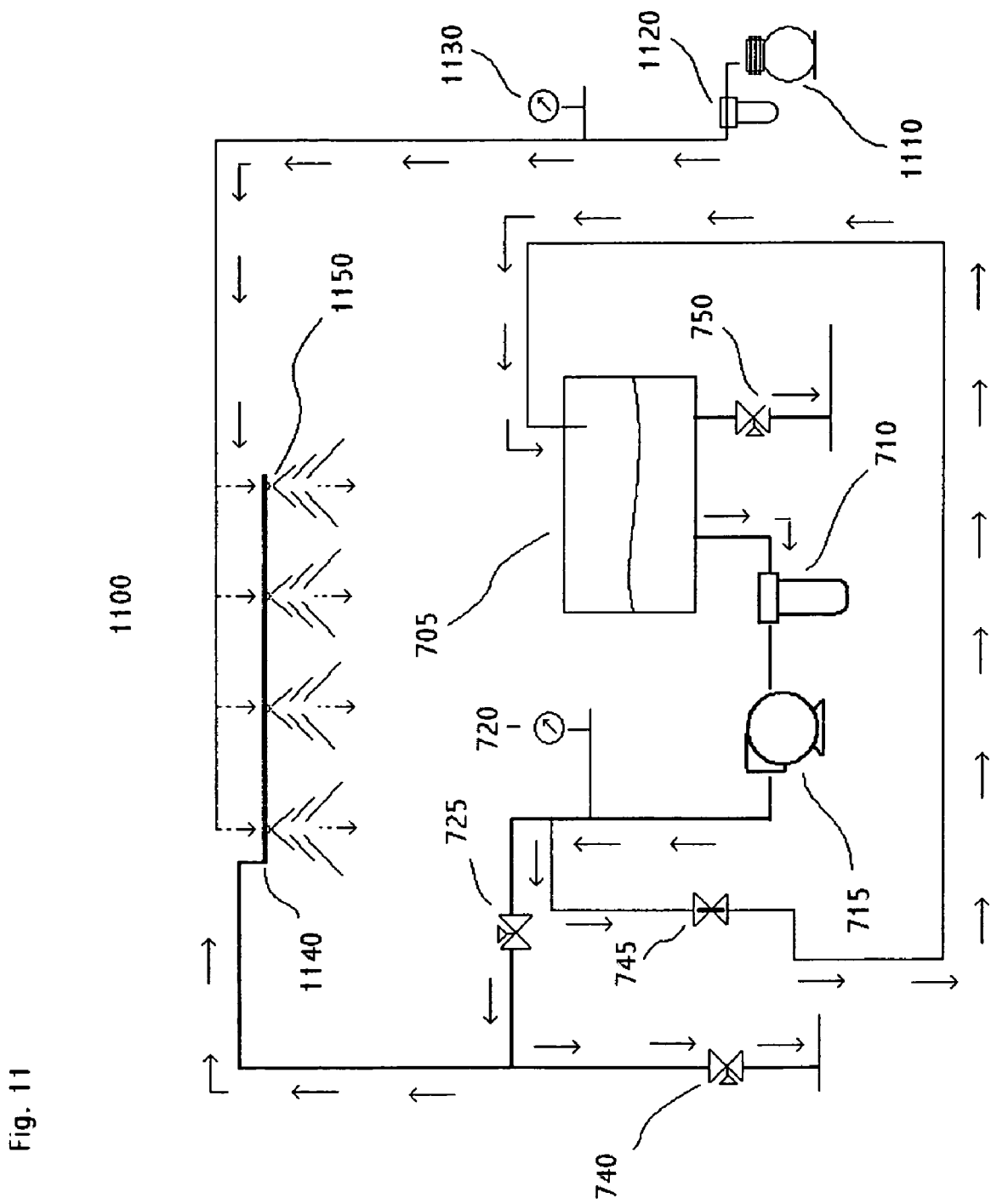
FIG. 11 illustrates the operational flow of portions of the present invention involving an air compressor, according to one embodiment.

A system for providing coolant gas to one or more fogging nozzles, such as fogging nozzle 1010, is shown in FIG. 11. The coolant delivery system 1100 illustrated in FIG. 11, according to one embodiment, comprises the components and capabilities of coolant delivery system 700 shown in FIG. 7 with additional components for delivering pressurized coolant gas to one or more fogging nozzles, such as fogging nozzle 1010. As shown in FIG. 11, according to one embodiment, coolant gas compressor 1110 provides pressurized coolant gas through coolant gas lines (not numbered) connecting the compressed coolant gas supply (or storage tank) associated with coolant gas compressor 1110 to one or more coolant gas conditioning stages 1120, continuing the flow of coolant gas, its pressure measured by PSI gauge 1130, to fog manifold 1140, with pressurized coolant gas directly into each of the one or more fogging nozzles 1150. In one embodiment, one or more solenoid valves (not shown) may be installed to controllably regulate the amount of coolant gas delivered to fogging nozzles 1150. In one embodiment, the one or more solenoid valves (not shown) are controlled at a control panel as discussed previously.

In one embodiment, each of the one or more fogging nozzles 1150 comprise external mix type fogging nozzle 800 and require approximately 1.8 cubic-feet-per-minute (cfm) at a given pressure for proper operation. In one embodiment, one or more metering valves (not shown) may be used for regulating coolant gas flow through fogging nozzles 1150 and coolant liquid flow through fogging nozzles 1150. As known in the art, the one or more metering valves may be connected just prior to each of the one or more fogging nozzles 1150 to allow for manual (or automated) adjustment of coolant gas flow (the rate of flow typically measured in cubic-feet-per-minute) and coolant liquid flow (the rate of flow typically measured in pounds-per-hour) to affect the size, shape, and coolant saturation level of the cooling pocket area of fog dispensed by fogging nozzles 1150. In one embodiment, the metering valves are integrated into each of the one or more fogging nozzles 1150. In another embodiment, the metering valves are disposed upstream of the one or more fogging nozzles 1150. In yet another embodiment, metering valves are optionally used with other components such as solenoid valve 725 (for coolant liquid flow control) and coolant gas compressor 1110 (for coolant gas flow control).

In one embodiment, coolant gas compressor 1110 delivers compressed coolant gas to one or more fogging nozzles 1150 without intervening one or more coolant gas conditioning stages 1120. In one embodiment, the one or more coolant gas conditioning stages 1120 comprise one or more coolant gas particulate filter and/or one or more ultraviolet (UV) lamp coolant gas conditioning device. In one embodiment, coolant gas conditioning stage 1120 comprises a 40 micron particulate filter to prevent clogging of fogging nozzle 1010. In one embodiment, coolant gas conditioning stage 1120 comprises an ultraviolet (UV) disinfection lamp device for removing bacteria and other contaminants in the coolant gas delivered to fogging nozzle 1010.

In one embodiment, pressurized coolant gas is delivered to one or more fogging nozzles 1150 through coolant gas lines connected to a coolant gas storage tank (not shown). As already discussed, in one embodiment, the coolant gas storage tank (not shown) comprises the coolant gas storage tank associated with coolant gas compressor 1110. Alternatively, coolant gas compressor 1110 may comprise a supply of compressed coolant gas disposed on the mobile platform (or in the case of a trailer installation, the vehicle associated with the mobile platform trailer). In one embodiment, the coolant gas comprises air supplied from an on-board air supply (on-board the mobile platform or vehicle).

As previously mentioned, in one embodiment, power provided to coolant gas compressor 1110 comprises mechanical power from belt linkages with a fan belt system of a drive motor (often a diesel or gasoline engine) inherent to a vehicle such as emergency response vehicle 100. Likewise, also previously mentioned, a power-take-off (PTO) device may be used to provide mechanical or rotational power (torque) to coolant gas compressor 1110 wherein coolant gas compressor 1110 is designed to work cooperatively with such a PTO device.

Figure 12:
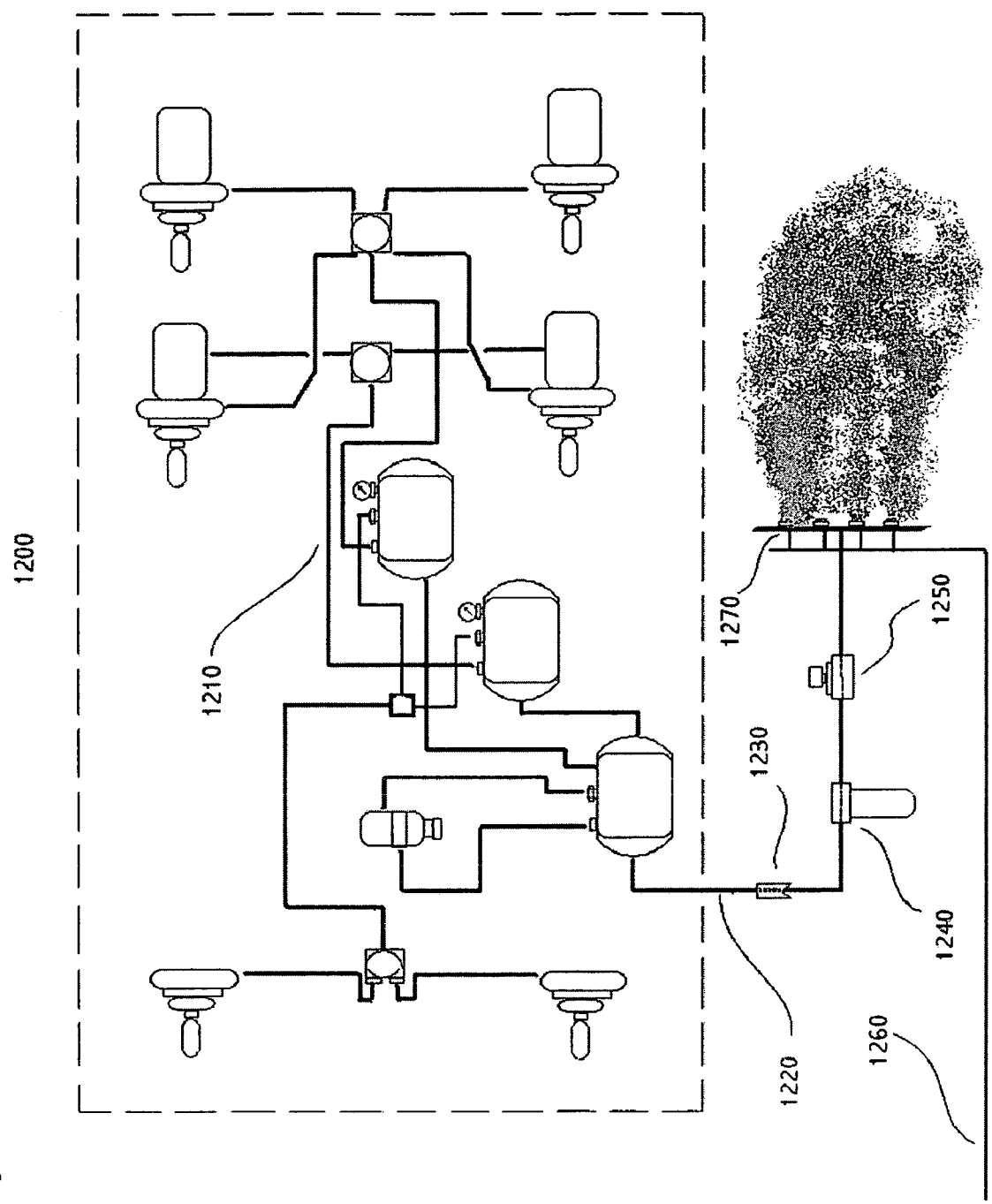
FIG. 12 illustrates the operational flow of portions of the present invention involving an air brake system, according to one embodiment.

An example of integrating the present invention with an available on-board air supply is illustrated in FIG. 12. Coolant delivery system 1200, in one embodiment, as shown in FIG. 12 comprises a typical commercial truck air brake system 1210 with air supply lines 1220 which may be used for non-braking purposes. It will be appreciated by those skilled in the art that typical commercial truck air brake system 1210 may be substituted with any available supply of compressed air. As shown, air supply lines 1220 deliver pressurized air to air filters 1230 and 1240, solenoid valve 1250, and finally, in cooperation with coolant liquid feed line 1260, to fogging nozzle 1270. In one embodiment, air filters 1230 and 1240 comprise one or more coolant gas particulate filter and/or one or more ultraviolet (UV) lamp coolant gas conditioning device. In one embodiment, solenoid valve 1250 may be used to controllably regulate the amount of coolant gas delivered to fogging nozzles 1270. In one embodiment, solenoid valve 1250 may be controlled at a control panel as discussed previously.

As described herein, the present invention provides a method and system for relief of heat exhaustion symptoms through evaporative and conductive cooling, and, more particularly, comprises a rapidly deployable mobile fogging system suitably designed for relief of heat exhaustion symptoms, including a mobile platform for transporting the rapidly deployable mobile fogging system to locations where relief of heat exhaustion symptoms is needed, one or more fogging nozzles disposed on the mobile platform and oriented for dispensing a cooling pocket area of fog adjacent to the mobile platform, a coolant delivery system fluidly connected to the one or more fogging nozzles, and one or more controls for regulating the dispensing of the cooling pocket area of fog.

Although a person having skill in the art may comprehend alterations and modifications of the present invention after having read the foregoing description, it is to be understood that the particular embodiments shown and described by way of illustration are in no way intended to be considered limiting. References to details of particular embodiments are not intended to limit the scope of the claims. Rather, it will be appreciated that many variations, modifications, and embodiments are possible, and all such variations, modifications, and embodiments are to be regarded as being within the spirit and scope of the invention.

We claim:

1. A rapidly deployable mobile fanless fogging system suitably designed for relief of heat exhaustion symptoms, comprising:
   a mobile platform for transporting said rapidly deployable mobile fogging system to locations where relief of heat exhaustion symptoms is needed;
   one or more fogging nozzles disposed on a side of said mobile platform and oriented for dispensing free from an air moving fan, a mixing chamber external to said one or more fogging nozzles, an impeller, or other coolant liquid atomizing means external to said one or more fogging nozzles a cooling pocket area of fog adjacent to said side of said mobile platform;
   a coolant delivery system fluidly connected to said one or more fogging nozzles, said coolant delivery system having a source of coolant liquid, a coolant delivery pump receiving the coolant liquid from said source of coolant liquid and delivering the coolant liquid at a suitable pressure for dispersion of the coolant liquid from said one or more fogging nozzles to create said cooling pocket area of fog, and one or more coolant fluid lines receiving the coolant liquid from said coolant delivery pump and delivering the coolant liquid to said one or more fogging nozzles; and
   one or more controls for regulating the dispensing of said cooling pocket area of fog.

2. The system of claim 1, wherein said mobile platform comprises an emergency response vehicle, an all-terrain type vehicle, a commercial vehicle, a recreational vehicle, or a vehicle trailer.

3. The system of claim 1, wherein said source of coolant liquid comprises a refillable reservoir.

4. The system of claim 1, further comprising one or more coolant liquid conditioning stages receiving the coolant liquid from said source of coolant liquid and delivering the coolant liquid to said coolant delivery pump, wherein said one or more coolant liquid conditioning stages comprise one or more particulate or ultraviolet (UV) liquid conditioning filters.

5. The system of claim 1, further comprising one or more coolant liquid conditioning stages receiving the coolant liquid from said source of coolant liquid and delivering the coolant liquid to said coolant delivery pump, wherein said one or more coolant liquid conditioning stages comprise one or more liquid chillers for lowering the temperature of the coolant liquid.

6. The system of claim 1, further comprising:
   a source of coolant gas,
   one or more coolant gas lines receiving the coolant gas from said source of coolant gas and delivering the coolant gas to said one or more fogging nozzles, wherein the coolant gas comprises air and said source of coolant gas comprises compressed air from an air compressor.

7. The system of claim 1, further comprising one or more coolant gas conditioning stages receiving the coolant gas from said source of coolant gas and delivering the coolant gas to said coolant gas lines, wherein said one or more coolant gas conditioning stages comprises one or more particulate or ultraviolet (UV) gas conditioning filters.

8. The system of claim 1, further comprising a power supply for providing power to said coolant delivery system, wherein said power supply comprises a power-take-off (PTO) device disposed on said mobile platform.

9. The system of claim 1, further comprising a power supply for providing power to said coolant delivery system, wherein said power supply comprises an engine fan belt system disposed on said mobile platform.

10. The system of claim 1, further comprising a power supply for providing power to said coolant delivery system, wherein said power supply comprises an engine alternator system.

11. A rapidly deployable mobile fanless fogging system suitably designed for relief of heat exhaustion symptoms, comprising:
    a mobile platform for transporting said rapidly deployable mobile fogging system to locations where relief of heat exhaustion symptoms is needed;
    one or more fogging nozzles disposed on a side of said mobile platform and oriented for dispensing free from an air moving fan, a mixing chamber external to said one or more fogging nozzles, an impeller, or other coolant liquid atomizing means external to said one or more fogging nozzles a cooling pocket area of fog adjacent to said side of said mobile platform;
    a coolant delivery system fluidly connected to said one or more fogging nozzles, said coolant delivery system having a source of coolant liquid, a coolant delivery pump receiving the coolant liquid from said source of coolant liquid and delivering the coolant liquid at a suitable pressure for dispersion of the coolant liquid from said one or more fogging nozzles to create said cooling pocket area of fog, and one or more coolant fluid lines receiving the coolant liquid from said coolant delivery pump and delivering the coolant liquid to said one or more fogging nozzles;
    one or more controls for regulating the dispensing of said cooling pocket area of fog;
    a source of coolant gas;
    one or more coolant gas lines receiving the coolant gas from said source of coolant gas and delivering the coolant gas to said one or more fogging nozzles; and
    one or more coolant liquid conditioning stages receiving the coolant liquid from said source of coolant liquid and delivering the coolant liquid to said coolant delivery pump, wherein said one or more coolant liquid conditioning stages comprise one or more liquid chillers for lowering the temperature of the coolant liquid.

12. The system of claim 11, wherein said mobile platform comprises one of an emergency response vehicle, an all-terrain type vehicle, a commercial vehicle, a recreational vehicle, and a vehicle trailer.

13. The system of claim 11, wherein said source of coolant liquid comprises a refillable reservoir.

14. The system of claim 11, further comprising:
    one or more coolant liquid conditioning stages receiving the coolant liquid from said source of coolant liquid and delivering the coolant liquid to said coolant delivery pump, wherein said one or more coolant liquid conditioning stages comprise one or more particulate or ultraviolet (UV) liquid conditioning filters; and one or more coolant gas conditioning stages receiving the coolant gas from said source of coolant gas and delivering the coolant gas to said coolant gas lines, wherein said one or more coolant gas conditioning stages comprises one or more particulate or ultraviolet (UV) gas conditioning filters.

15. The system of claim 11, wherein the coolant gas comprises air and said source of coolant gas comprises compressed air from an air brakes system.

16. The system of claim 11, wherein the coolant gas comprises air and said source of coolant gas comprises compressed air from an air compressor.

17. The system of claim 11, further comprising a power supply for providing power to said coolant delivery system, wherein said power supply comprises an engine alternator system.

18. The system of claim 11, further comprising a power supply for providing power to said coolant delivery system, wherein said power supply comprises a power-take-off (PTO) device.

19. The system of claim 11, further comprising a power supply for providing power to said coolant delivery system, wherein said power supply comprises an engine fan belt system.

20. A rapidly deployable mobile fanless fogging system suitably designed for relief of heat exhaustion symptoms, comprising:

a mobile platform for transporting said rapidly deployable mobile fogging system to locations where relief of heat exhaustion symptoms is needed, wherein said mobile platform comprises an emergency response vehicle, an all-terrain type vehicle, a commercial vehicle, a recreational vehicle, or a vehicle trailer;

one or more fogging nozzles disposed on a side of said mobile platform and oriented for dispensing free from an air moving fan, a mixing chamber external to said one or more fogging nozzles, an impeller, or other coolant liquid atomizing means external to said one or more fogging nozzles a cooling pocket area of fog adjacent to said side of said mobile platform;

a coolant delivery system fluidly connected to said one or more fogging nozzles, said coolant delivery system having a source of coolant liquid, a coolant delivery pump receiving the coolant liquid from said source of coolant liquid and delivering the coolant liquid at a suitable pressure for dispersion of the coolant liquid from said one or more fogging nozzles to create said cooling pocket area of fog, and one or more coolant fluid lines receiving the coolant liquid from said coolant delivery pump and delivering the coolant liquid to said one or more fogging nozzles, wherein said source of coolant liquid comprises a refillable reservoir;

one or more controls for regulating the dispensing of said cooling pocket area of fog;

a power supply for providing power to said coolant delivery system, wherein said power supply comprises a generator, an engine alternator system, a power-take-off (PTO) device or an engine fan belt system; and one or more coolant liquid conditioning stages receiving the coolant liquid from said source of coolant liquid and delivering the coolant liquid to said coolant delivery pump, wherein each of said one or more coolant liquid conditioning stages comprises a particulate filter or ultraviolet (UV) liquid conditioning filter or liquid chiller, said liquid chiller for lowering the temperature of the coolant liquid.

* * * * *